(12) United States Patent
Miyagawa et al.

(10) Patent No.: US 8,851,986 B2
(45) Date of Patent: Oct. 7, 2014

(54) GAME PROGRAM AND GAME APPARATUS

(75) Inventors: Takuya Miyagawa, Fukuoka (JP); Satoshi Kira, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1410 days.

(21) Appl. No.: 11/790,148

(22) Filed: Apr. 24, 2007

(65) Prior Publication Data

US 2007/0279396 A1    Dec. 6, 2007

(30) Foreign Application Priority Data

May 2, 2006    (JP) .................................. 2006-128219

(51) Int. Cl.
| | |
|---|---|
| A63F 9/00 | (2006.01) |
| G06F 3/0488 | (2013.01) |
| G06F 1/16 | (2006.01) |
| A63F 13/40 | (2014.01) |

(52) U.S. Cl.
CPC .............. *A63F 13/10* (2013.01); *G06F 3/0488* (2013.01); *G06F 1/1647* (2013.01); *A63F 2300/204* (2013.01); *G06F 1/1616* (2013.01); *G06F 1/1692* (2013.01); *A63F 2300/807* (2013.01); *A63F 2300/301* (2013.01); *G06F 2200/1614* (2013.01); *G06F 1/1656* (2013.01); *A63F 2300/1075* (2013.01); *G06F 1/1677* (2013.01)
USPC .......................................................... 463/31

(58) Field of Classification Search
USPC .................................................. 345/1.3, 1.1
See application file for complete search history.

(56) References Cited

U.S. PATENT DOCUMENTS

| | | | | |
|---|---|---|---|---|
| 4,542,903 | A * | 9/1985 | Yokoi et al. ...................... | 463/31 |
| 5,351,189 | A * | 9/1994 | Doi et al. .......................... | 704/3 |
| 5,358,259 | A * | 10/1994 | Best ................................ | 463/31 |
| 5,414,444 | A * | 5/1995 | Britz ............................. | 345/156 |
| 5,661,632 | A * | 8/1997 | Register ..................... | 361/679.3 |
| 5,854,997 | A * | 12/1998 | Sukeda et al. .................... | 704/3 |
| 5,900,848 | A * | 5/1999 | Haneda et al. ................. | 345/1.1 |
| 6,254,481 | B1 * | 7/2001 | Jaffe .............................. | 463/20 |
| 6,270,402 | B1 * | 8/2001 | Fujioka et al. .................... | 463/2 |

(Continued)

FOREIGN PATENT DOCUMENTS

| | | |
|---|---|---|
| JP | 2001-5438 | 1/2001 |
| JP | 2001-149640 | 6/2001 |

(Continued)

OTHER PUBLICATIONS

Sega▲R▼ Official Guide Book Skura Taisen V Episode 0 ~kouya no samurai musume Official Guide Book, Japan, Aspect, Inc., Oct. 1, 2004, 1st ed., p. 25.

(Continued)

*Primary Examiner* — Seng H Lim
(74) *Attorney, Agent, or Firm* — Nixon & Vanderhye P.C.

(57) ABSTRACT

A game apparatus includes a first LCD and a second LCD. The first LCD and the second LCD are arranged in either side of a predetermined axis. A computer of the game apparatus respectively displays a first character image and a second character image on the first LCD and the second LCD, and further respectively displays a first message image and a second message image on the first LCD and the second LCD. Then, in response to a predetermined operation performed via a touch panel, etc., at least one of the first message image and the second message image respectively displayed on the first LCD and the second LCD is updated.

11 Claims, 12 Drawing Sheets

(56) References Cited

U.S. PATENT DOCUMENTS

| | | | |
|---|---|---|---|
| 6,347,993 B1* | 2/2002 | Kondo et al. | 463/1 |
| 6,579,183 B1* | 6/2003 | Hiromi et al. | 463/30 |
| 6,606,104 B1* | 8/2003 | Kondo et al. | 715/764 |
| 6,897,850 B2* | 5/2005 | Sugimoto | 345/169 |
| 6,970,210 B2* | 11/2005 | Kim et al. | 349/58 |
| 6,985,135 B2* | 1/2006 | Sugimoto | 345/169 |
| 6,993,474 B2* | 1/2006 | Curry et al. | 704/3 |
| 7,002,604 B1* | 2/2006 | Barrus et al. | 345/649 |
| 7,033,275 B1 | 4/2006 | Endo et al. | |
| 7,071,917 B2* | 7/2006 | Kori | 345/157 |
| 7,445,549 B1* | 11/2008 | Best | 463/32 |
| 7,573,462 B2* | 8/2009 | Ouchi | 345/157 |
| 7,844,301 B2* | 11/2010 | Lee et al. | 455/566 |
| 2002/0018027 A1* | 2/2002 | Sugimoto | 345/1.3 |
| 2002/0173965 A1* | 11/2002 | Curry et al. | 704/275 |
| 2003/0013508 A1* | 1/2003 | Sato | 463/8 |
| 2003/0036431 A1* | 2/2003 | Futatsugi et al. | 463/43 |
| 2004/0152518 A1* | 8/2004 | Kogo | 463/42 |
| 2005/0143124 A1* | 6/2005 | Kennedy et al. | 455/556.1 |
| 2005/0245313 A1* | 11/2005 | Yoshino et al. | 463/30 |
| 2006/0073862 A1* | 4/2006 | Shinoda et al. | 463/1 |
| 2007/0046561 A1* | 3/2007 | Cheon et al. | 345/1.1 |
| 2007/0057866 A1* | 3/2007 | Lee et al. | 345/1.1 |
| 2007/0085759 A1* | 4/2007 | Lee et al. | 345/1.1 |
| 2007/0207860 A1* | 9/2007 | Yamauchi et al. | 463/42 |
| 2008/0109208 A1* | 5/2008 | Curry et al. | 704/3 |
| 2009/0029739 A1* | 1/2009 | Okamoto et al. | 455/566 |

FOREIGN PATENT DOCUMENTS

| | | |
|---|---|---|
| JP | 2004-290269 | 10/2004 |
| JP | 2005-278938 | 10/2005 |
| JP | 2006-006429 | 1/2006 |

OTHER PUBLICATIONS

Dengeki PlayStation, Japan, MediaWorks, Inc., Oct. 29, 2004, 10th volume, 28th issue, partial English translation, pp. 36-37 (7 pages).

Dragon Quest & Final Fantasy in Itadaki Street Special Official Perfect Guide, Japan, Square Enix Co., Ltd., Apr. 20, 2005, first edition, 3rd printing, partial English translation, p. 146 (6 pages).

* cited by examiner

FIG.12
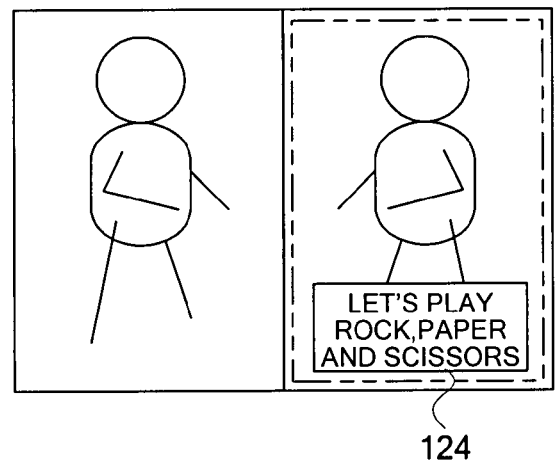
(A)
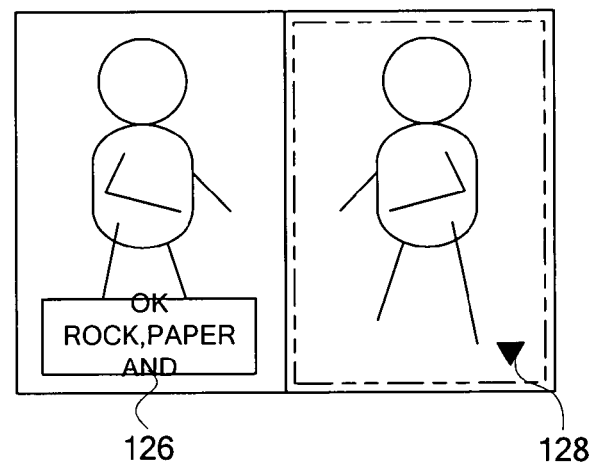
(B)
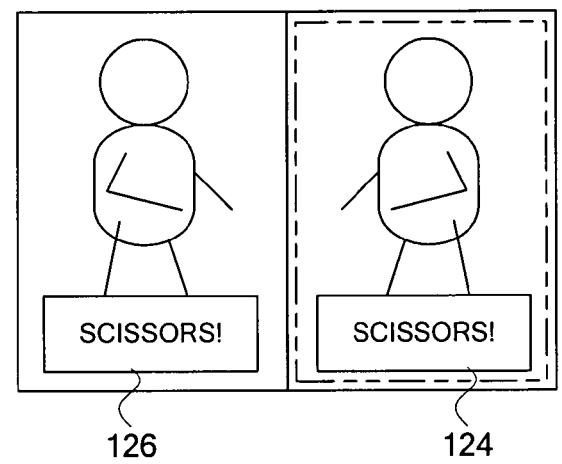
(C)

GAME PROGRAM AND GAME APPARATUS

CROSS REFERENCE TO RELATED APPLICATION

The disclosure of Japanese Patent Application No. 2006-128219 is incorporated herein by reference.

TECHNICAL FIELD

The present invention relates to a game program and a game apparatus. More specifically, the present invention relates to a game program and a game apparatus in which characters have a conversation with each other.

BACKGROUND AND SUMMARY

As a conventional apparatus of such a kind, one disclosed in Japanese Patent Laying-open No. 2004-290269 (Patent Document 1) is known. In the prior art, two characters are displayed, and two messages (speeches) corresponding to these two characters are alternately or simultaneously displayed.

Furthermore, one disclosed in Japanese Patent Laying-open No. 2006-6429 (Patent Document 2) is known. The prior art displays a plurality of characters and one speech balloon. The speech balloon is formed by a box portion and a pointer portion, and in the box portion, a message corresponding to any one of the plurality of characters is described. A character corresponding to a message within the box is indicated by the direction of a pointer.

In the related art of Patent Document 1, two characters and two messages are displayed on a single screen, and therefore, a corresponding relationship between the characters and the messages are difficult to know. Furthermore, in a case that a display screen is small like a hand-held type game apparatus, a message is especially difficult to read.

In the related art of Patent Document 2, only message of any one of the characters is displayed at one time, being short of an atmosphere in which the characters have a conversation.

Therefore, it is a primary feature to provide a novel game program and a novel game apparatus.

Another feature is to provide a game program and a game apparatus capable of displaying a conversation between the characters clearly and emotionally.

A game program according to a first embodiment causes a computer (42) of a game apparatus (10: reference numeral designating a portion corresponding in the embodiments. This hold true for the later.) to execute a first character image displaying step (S23), a second character image displaying step (S27), a first message image displaying step (S37), and a second message image displaying step (S45). The game apparatus has a first display (14) and a second display (12) which are adjacent with each other, a memory (48) storing first character image data and second character image data, and first message data and second message data respectively associated with the first character image data and the second character image data, and an operating means (22, 20).

The first character image displaying step displays a first character image based on the first character image data on the first display. The second character image displaying step displays a second character image based on the second character image data on the second display. The first message image displaying step further displays a first message image based on the first message data on the first display while the first character image is displayed. The second message image displaying step further displays a second message image based on the second message data on the second display while the second character image is displayed. The message updating step updates at least any one of the first message image which is being displayed on the first display and the second message image which is being displayed on the second display when a predetermined operation is performed by the operating means.

In the first embodiment, the game apparatus comprises a first display, a second display, a memory, and an operating means. The first display and the second display are adjacent with each other, and the memory stores first character image data and second character image data, and first message data and second message data which are respectively associated with the first character and the second character.

A first character image based on the first character image data in the memory is displayed on the first display by a first character image displaying step, and a second character image based on the second character image data in the memory is displayed on the second display by a second character image displaying step. While the first character image and the second character image are respectively displayed on the first display and the second display, a first message image based on the first message data in the memory is further displayed on the first display by a first message image displaying step, and a second message image based on the second message data in the memory is further displayed on the second display by a second message image displaying step. When a predetermined operation is performed by the operating means, at least any one of the first message image which is being displayed on the first display and the second message image which is being displayed on the second display is updated.

According to the first embodiment, the first character and the first message corresponding thereto are displayed on the first display, and the second character and the second message corresponding thereto are displayed on the second display, and therefore, the player can clearly know a corresponding relationship between characters and messages, and even a smaller display allows the player to easily read the message. Furthermore, the first character and the first message, and the second character and the second message are displayed to be adjacent with each other, and at least any one of the first message and the second message is updated in response to a predetermined operation, capable of directing an atmosphere in which the characters have a conversation with each other.

It is preferable that the first display and the second display which are adjacent with each other are located in either side of a predetermined axis. Thus, it is possible to obtain an atmosphere in which the player character and the non-player character have a conversation next to each other. Alternatively, the first display and the second display can be placed vertically. In such a case, it is possible to make an atmosphere in which a player character on the first floor and a non-player character on the second floor have a conversation, for example.

A game program according to a second embodiment is dependent on the first embodiment, and causes the computer to further execute a first reading step (S33), a first rotation processing step (S35), a second reading step (S41), and a second rotation processing step (S43). The first display and the second display are arranged in either side of a predetermined axis, and each of the first character image data and the second character image data has display directivity of a first direction along the axis. The memory further stores font image data having display directivity of a second direction different from the first direction by a predetermined angle.

The first reading step reads the font image data from the memory in accordance with the first message data. The first rotation processing step performs rotation processing by the predetermined angle on the font image data read by the first reading step. The display processing by the first message image displaying step is executed on the basis of the font image data on which the rotating processing has been performed. The second reading step reads the font image data from the memory in accordance with the second message data. The second rotation processing step performs rotation processing by the predetermined angle on the font image data read by the second reading step. The display processing by the second message image displaying step is performed on the basis of the font image data on which the rotation processing has been performed.

In the second embodiment, the font image data in the memory is read by a first reading step in accordance with the first message data in the memory. The read font image data is subjected to a rotation processing by a predetermined angle by a first rotation processing step, and a first message image based on the font image data after the rotation processing is displayed.

Furthermore, the font image data in the memory is read by a second reading step in accordance with the second message data. The read font image data is subjected to a rotation processing by a predetermined angle by a second rotation processing step, and a second message image based on the font image data after the rotation processing is displayed.

According to the second embodiment, display directivity of the first message image data and the second message image data are coincident with the display directivity of the first character image and the second character image by rotation processing, and therefore, it is possible to accurately display the first message image and the second message image. In other words, without preparing dedicated font image data being subjected to rotation processing in advance, it is possible to utilize versatile font image data.

A game program according to a third embodiment is dependent on the second embodiment. A display surface of each of the first display and the second display has a rectangular shape, and the predetermined angle is 90 degrees. The first display and the second display are arranged in such a position that a longitudinal direction of each of the display surfaces is coincident with the first direction, and a straight line (X) passing through a central point of each of the display surfaces is vertical to the axis.

A game program according to a fourth embodiment is dependent on any one of the first to the third embodiments. The first messages displaying step and the second message displaying step respectively displays the first message image and the second message image at the same height. It should be noted that "the first message image and the second message image are displayed at the same height" means that they are displayed at positions symmetrical with respect to the above-described axis.

According to the fourth embodiment, it becomes easy to read the first message and the second message.

A game program according to a fifth embodiment is dependent on any one of the first to the fourth embodiments. The game apparatus further has a first housing (16b) and a second housing (16a) connected to be rotated about the axis. The first display and the second display are respectively provided to the first housing and the second housing.

According to the fifth embodiment, the first housing and the second housing are rotated by a proper angle (10-20 degrees, for example) in such a direction the display surface of the first display and the display surface of the second display are face to face with each other (cover closing direction), and whereby, the characters look like they have a communication with each other, making an atmosphere rich.

A game program according to a sixth embodiment is dependent on any one of the first to the fifth embodiments, and causes a computer to further execute an icon image displaying step (S47). The operating means includes a touch panel (22) set on the first display.

The icon image displaying step further displays an icon image on the first display in association with the display processing by the first message image displaying step and the second message image displaying step. The message updating step executes updating processing when a touch operation to the icon image is detected by the touch panel.

In the sixth embodiment, in association with the display processing of the first message image displaying step and the second message image displaying step, an icon image is further displayed on the first display by an icon image displaying step. The updating processing by the message updating step is executed when a touch operation on the icon image is detected via the touch panel. It should be noted that the updating processing may be executed in response to an operation of pushing the operating switch (20) provided on the game apparatus as well as a touch operation on the icon image.

A game program according to a seventh embodiment is dependent on the fifth or the sixth embodiment. The game apparatus further comprises a detecting means (64) for detecting an opened and closed state of the first housing and the second housing. The message updating step executes updating processing in association with a detection result by the detecting means.

In the seventh embodiment, an opened and closed state of the first housing and the second housing (that is, a positional relationship between the both housings) is detected by a detecting means, and the updating process by the message updating step is executed by a detection result by the detecting means.

According to the seventh embodiment, an operation of changing a positional relationship between the first housing and the second housing, that is, by an operation of opening and closing the cover, it is possible to update a message. By taking the operation of opening and closing the cover as a trigger of updating the message, it is possible to enhance entertainment of the game.

A game program according to an eighth embodiment is dependent on the seventh embodiment, and causes the computer to execute a first determining step (S51), a second determining step (S53), and a third determining step (S55). Each of the first message data and the second message data stored in the memory are associated with any of a plurality of game scenes. The memory further stores scene identifying data for identifying which of the plurality of game scenes each of the first message data and the second message data stored in the memory is associated with. The positional relationship is an angle ($\theta$) formed by the first housing and the second housing.

The first determining step determines whether or not a detection result by the detecting means is below a first threshold value. The second determining step determines whether or not the scene identifying data indicates a specific game scene when a determination result by the first determining step is affirmative. The third determining step determines a detection result by the detecting means is above a second threshold value when a determination result by the second determining step is affirmative. The message updating step executes updating process when a determination result by the third determining step is affirmative.

In the eighth embodiment, first, it is determined whether or not the detection result by the detecting means, that is, the angle formed by the first housing and the second housing is below a first threshold value by a first determining step. A second determining step determines whether or not the scene identifying data indicates a specific game scene when a determination result by the first determining step is affirmative. A third determining step determines whether or not a detection result by the detecting means is above a second threshold value when a determination result by the second determining step is affirmative. The updating process by the message updating step is executed when the determination result by the third determining step is affirmative. It should be noted that the first threshold value and the second threshold value may be the same or different from each other.

According to the eighth embodiment, if the cover is once closed in a specific game scene, and then opened, the message is updated. Additionally, the specific game scene is a kiss scene, for example.

A game apparatus (10) according to a ninth embodiment comprises a first display (14) and a second display (12) which are adjacent with each other, a memory (48) storing first character image data and second character image data, and first message data and second message data respectively associated with the first character image data and the second character image data, an operating means (22, 20), a first character image displaying means (S23) for displaying a first character image based on the first character image data on the first display, a second character image displaying means (S27) for displaying a second character image based on the second character image data on the second display, a first message image displaying means (S37) for further displaying a first message image based on the first message data on the first display while the first character image is displayed, a second message image displaying means (S45) for further displaying a second message image based on the second message data on the second display while the second character image is displayed, and a message updating means (S57) for updating at least any one of the first message image which is being displayed on the first display and the second message image which is being displayed on the second display when a predetermined operation is performed by the operating means.

In the ninth embodiment also, it is possible to clearly know a corresponding relationship between the characters and the messages similarly to the first embodiment, capable of reading a message. Furthermore, it is possible to direct an atmosphere in which the characters have a conversation.

A controlling method according to a tenth embodiment is a controlling method of a game apparatus having a first display and a second display which are adjacent with each other, a memory storing first character image data and second character image data, and first message data and second message data respectively associated with the first character image data and the second character image data, and an operating means, and comprises a first character image displaying step for displaying a first character image based on the first character image data on the first display, a second character image displaying step for displaying a second character image based on the second character image data on the second display, a first message image displaying step for further displaying a first message image based on the first message data on the first display while the first character image is displayed, a second message image displaying step for further displaying a second message image based on the second message data on the second display while the second character image is displayed, and a message updating step for updating at least any one of the first message image which is being displayed on the first display and the second message image which is being displayed on the second display when a predetermined operation is performed by the operating means.

In the tenth embodiment also, it is possible to clearly know a corresponding relationship between the characters and the messages similarly to the first embodiment, capable of easily reading a message. Furthermore, it is possible to direct an atmosphere in which the characters have a conversation with each other.

Accordingly, it is possible to clearly and emotionally display a conversation between the characters.

The above described features, aspects and advantages of the embodiments described herein will become more apparent from the following detailed description when taken in conjunction with the accompanying drawings.

BRIEF DESCRIPTION OF THE DRAWINGS

FIGS. 12 (A)-FIG. 12 (C) are illustrative views showing changes of the game screen in the other embodiment in time sequence.

DETAILED DESCRIPTION

Figure 1:
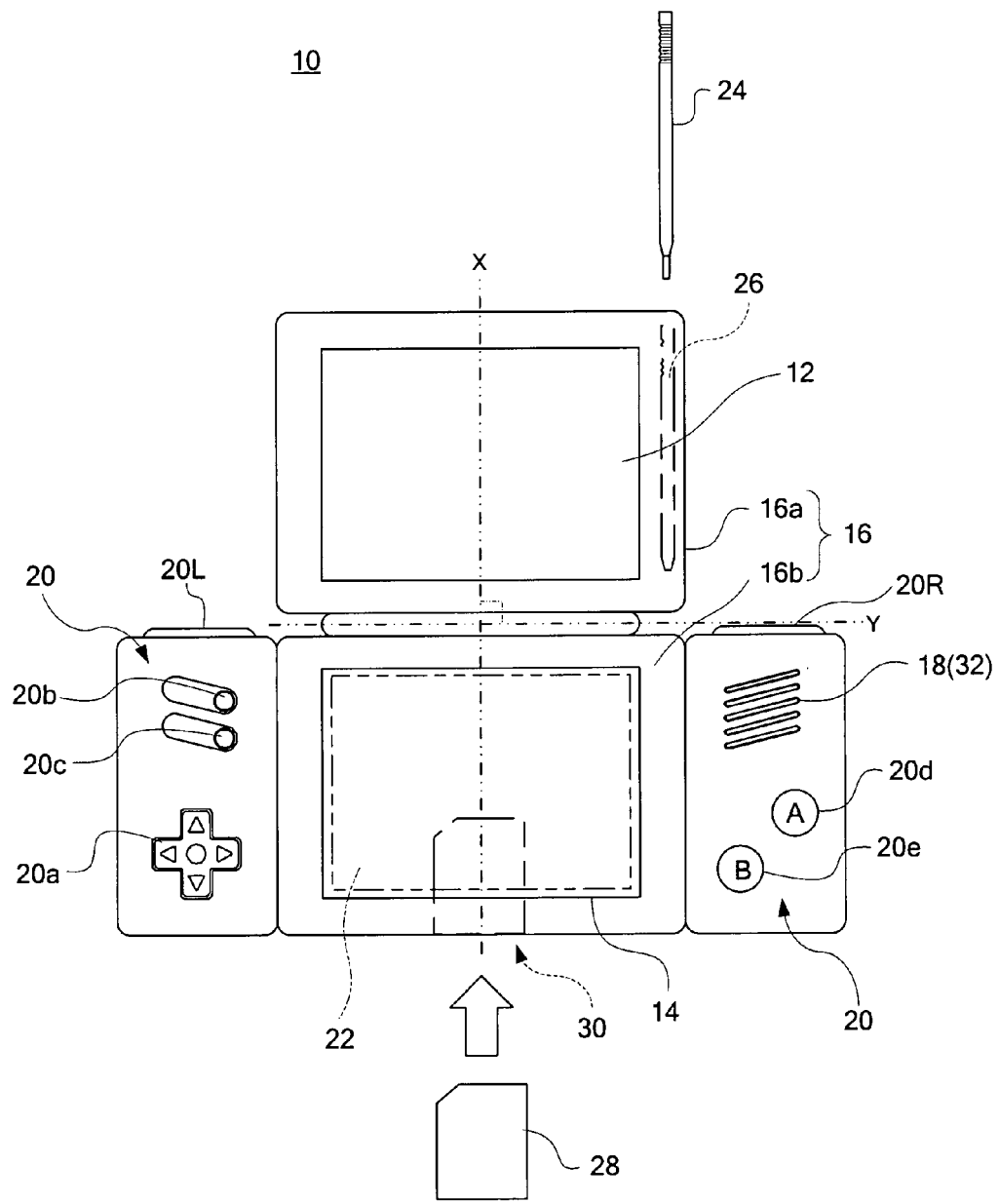
FIG. 1 is an illustrative view showing one embodiment.

Referring to FIG. 1, a game apparatus 10 of one embodiment includes a first liquid crystal display (LCD) 12 and a second LCD 14. The LCD 12 and the LCD 14 are provided on a housing 16 so as to be arranged in a predetermined position. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Also, on the lower housing 16*b*, a sound release hole 18 is formed, and various operating switches 20 (20*a*, 20*b*, 20*c*, 20*d*, 20*e*, 20L and 20R) are provided.

In addition, the upper housing 16*a* and the lower housing 16*b* are connected to be rotated about a rotation axis Y at a lower side (lower edge) of the upper housing 16*a* and a part of an upper side (upper edge) of the lower housing 16*b*. Accordingly, in a case of not playing a game, for example, if the upper housing 16*a* is rotated to be folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16*a* and the lower housing 16*b* are not necessarily rotatably connected with each other, and may alternatively be provided integrally (fixedly) to form the housing 16.

It should be noted that a state in which the upper housing 16*a* is pivoted and folded such that the display surface of the LCD 12 and the display surface of the LCD 14 are face to face with each other (not illustrated) is called "a state in which the cover is closed", a state in which the display surface of the LCD 12 and the display surface of the LCD 14 are the same direction (that is, the state shown in FIG. 1 or FIG. 4) is called "a state in which the cover is completely opened", and a state in which both of the states are not applied is called "a state in which the cover is incompletely opened". In the state in which the cover is completely opened, it is considered that the display surface of the LCD 12 and the display surface of the LCD 14 are coplanar, and a straight line passing through the center of the display surface of the LCD 12 and the center of the display surface of the LCD 14 is defined as a "main axis X". The main axis X is vertical to the above-described rotation axis Y.

Figure 6:
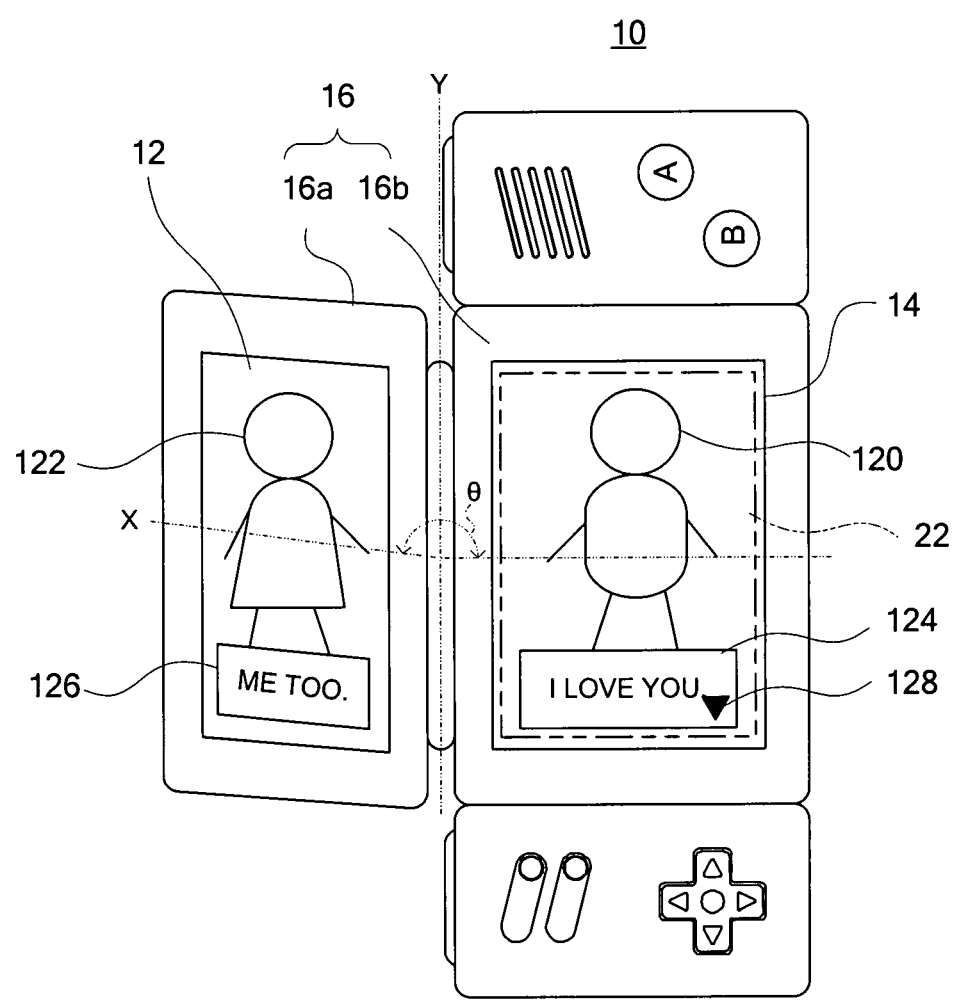
FIG. 6 is an illustrative view showing another example of the game screen applied to FIG. 1 embodiment.

Furthermore, the main axis X is folded as shown in FIG. 6 in the state in which the cover is incompletely opened. The folded angle, that is, the angle (the angle formed by the display surface of the LCD 12 and the display surface of the LCD 14) formed by the upper housing 16*a* and the lower housing 16*b* is called a rotating angle $\theta$ (noted, $0 \leq \theta \leq 180°$.) In the state in which the cover is completely opened, $\theta = 180°$, and in the state in which the cover is closed, $\theta = 0$.

The operating switch 20 includes a direction designating switch (cross key) 20*a*, a start switch 20*b*, a select switch 20*c*, an action switch (A button) 20*d*, an action switch (B button) 20*e*, an action switch (L button) 20L, and an action switch (R button) 20R. The switches 20*a*, 20*b* and 20*c* are placed at the left of the LCD 14 on the one main surface of the lower housing 16*b*. Also, the switches 20*d* and 20*e* are placed at the right of the LCD 14 on the one main surface of the lower housing 16*b*. Furthermore, the switches 20L and 20R are placed in a part of an upper edge (top surface) of the lower housing 16*b* at a place except for a connected portion with the upper housing 16*a*, and lie of each side of the connected portion.

The direction designating switch 20*a* functions as a digital joystick. By operating any one of four depression portions a1-a4 arranged left, right, upper and lower directions in this order, it is possible to instruct or designate a moving direction of a player character or a player object to be operated by a player and a cursor, and so forth.

The start switch 20*b* is formed by a push button, and is utilized for starting (restarting), temporarily stopping a game, and so forth. The select switch 20*c* is formed by a push button, and utilized for a game mode selection, etc.

The action switch 20*d*, that is, the A button is formed by a push button, and allows the player character to perform an arbitrary movement (action), except for instructing the direction, such as hitting (punching), throwing, holding (acquiring), riding, jumping, cutting, etc. For example, in an action game, it is possible to apply an instruction of jumping, punching, moving weapon, etc. In a role-playing game (RPG) and a simulation RPG, it is possible to apply an instruction of obtaining items, selecting and determining weapons or commands, etc. The action switch 20*e*, that is, the B button is formed by a push button, and is utilized for changing a game mode selected by the select switch 20*c*, canceling an action determined by the A button 20*d*, and so forth.

The action switch (L button) 20L and the action switch (R button) 20R are formed by push buttons, and the L button 20L and the R button 20R can perform the same operation as the A button 20*d* and the B button 20*e*, and also function as a subsidiary of the A button 20*d* and the B button 20*e*.

Additionally, on a top surface of the LCD 14, a touch panel 22 is provided. As the touch panel 22, any one of kinds of a resistance film system, an optical system (infrared ray system) and an electrostatic capacitive coupling system, for example, can be utilized. In response to an operation by pushing, stroking, touching, hitting, and so forth with a stick 24, a pen (stylus pen), or a finger (hereinafter, referred to as "stick or the like 24") on a top surface of the touch panel 22, the touch panel 22 detects a coordinates position operated (that is, subjected to a touch input) by the stick or the like 24 to output coordinates data corresponding to the detected coordinates.

In addition, a resolution of the display surface of the LCD 14 is 256 dots×192 dots, and a detection accuracy of a detection surface (operation surface) of the touch panel 22 is also rendered as 256 dots×192 dots in correspondence to the resolution of the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD, and a game screen (operation screen) including an image such as diagram information, an icon, etc. for operating the game may be displayed on the other LCD. Furthermore, by utilizing the two LCD 12 and LCD 14 as one screen, it is possible to display a large monster (enemy character) to be defeated by the player character.

Accordingly, the player is able to point a character image such as a player character, an enemy character, an item character, diagram information, an icon, etc. to be displayed on the LCD 14 and select commands by operating the touch panel 22 with the use of the stick or the like 24. In addition, depending on the kind of the game, the player is able to use the stick or the like 24 for another various input instructions, such as selecting or operating the icon displayed on the LCD 14, instructing a coordinate input, and so forth.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Furthermore, in this embodiment, the stick 24 can be inserted into a housing portion (slot or concave) 26 provided in proximity to a side surface (right side surface) of the upper housing 16a, for example, and taken out therefrom as necessary. However, in a case of preparing no stick 24, it is not necessary to provide the housing portion 26.

Also, the game apparatus 10 includes a memory card (or a game cartridge) 28. The memory card 28 is detachable, and inserted into a loading slot 30 provided on a rear surface or a bottom surface (lower edge) of the lower housing 16b. Although omitted in FIG. 1, a connector 46 (see FIG. 2) is provided at a back portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

Although not illustrated in FIG. 1, a speaker 32 (see FIG. 2) is provided at a position corresponding to the sound release hole 18 inside the lower housing 16b.

Furthermore, although omitted in FIG. 1, a battery accommodating box is provided on a rear surface of the lower housing 16b, for example, and a power switch, a volume switch, an external expansion connector, an earphone jack, etc. are provided on a bottom surface of the lower housing 16b.

Figure 2:
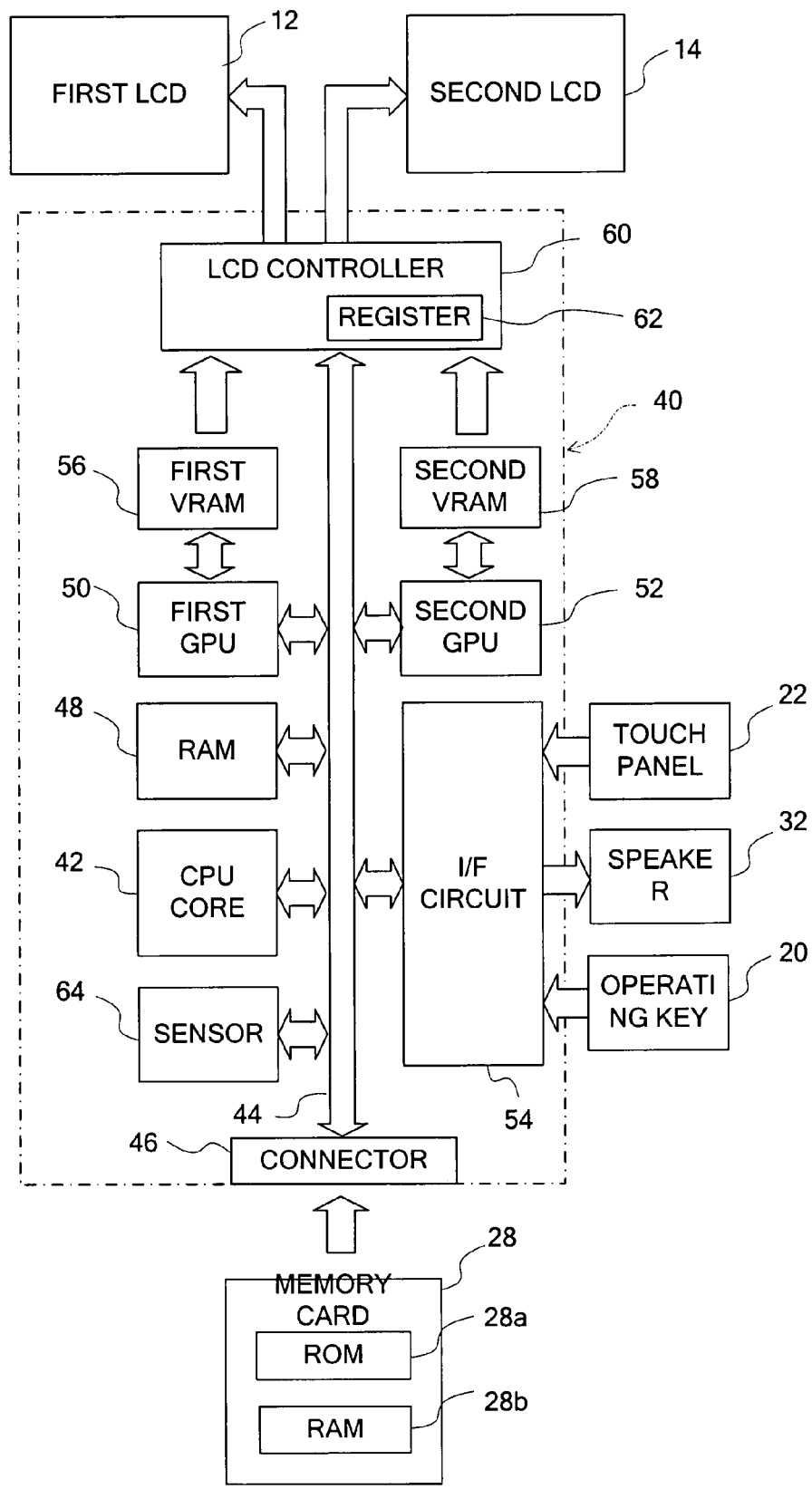
FIG. 2 is a block diagram showing an electric configuration of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, circuit components, such as a CPU core 42, etc. are mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a sensor 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 can access the ROM 28a and the RAM 28b as described above.

The ROM 28a stores in advance a game program for a game (virtual game) to be executed by the game apparatus 10, image data (character image, background image, item image, icon (button) image, message image, etc.), data of the sound (music) necessary for the game (sound data), etc. The RAM (backup RAM) 28b stores (saves) proceeding data and result data of the game.

The RAM 48 is utilized as a buffer memory or a working memory (work RAM). That is, the CPU core 42 loads the game program, the image data, the sound data, etc. stored in the ROM 28a of the memory card 28 into the RAM 48, and executes the loaded game program. The CPU core 42 executes a game process while storing data (game data, flag data, etc.) generated or obtained in correspondence with a progress of the game in the RAM 48.

Additionally, the game program, the image data, the sound data, etc. are read from the ROM 28a entirely at a time, or partially and sequentially as necessary so as to be stored into the RAM 48.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 50 and the GPU 52 forms a part of a rendering means, is constructed by, for example, a single chip ASIC, and receives a graphics command (construction command) from the CPU core 42 to generate game image data according to the graphics command. The CPU core 42 applies an image generation program (included in the game program) required to generate game image data to both of the GPU 50 and GPU 52 in addition to the graphics command.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. The CPU core 42 reads image data necessary for drawing from the RAM 48, and writes it to the first VRAM 56 and the second VRAM 58 via the GPU 50 and the GPU 52. The GPU 50 accesses the VRAM 56 to generate game image data for display, and stores it in a rendering buffer in the VRAM 56. The GPU 52 accesses the VRAM 58 to produce game image data for drawing, and stores the image data in a drawing buffer of the VRAM 58. A flame buffer, a line buffer, etc. may be employed as the drawing buffer.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

In addition, the LCD controller 60 can directly read the game image data from the VRAM 56 and the VRAM 58, or read the game image data from the VRAM 56 and the VRAM 58 via the GPU 50 and the GPU 52.

Also, the VRAM 56 and the VRAM 58 may be provided in the RAM 48, or the drawing buffer and a Z buffer may be provided in the RAM 48.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game, such as a game music (BGM), a sound effect or voices of a game character (onomatopoeic sound), etc., and outputs it from the speaker 32 via the I/F circuit 54.

The sensor 64 detects an opened and closed state of the cover, and specifically detects an angle (rotating angle θ: see FIG. 6) formed by the upper housing 16a and the lower housing 16b. The detection result by the sensor 64 is utilized for a mode selection between a play mode and a sleep mode, etc. Furthermore, in a case that a conversation game is played, this may be used as a trigger when a message is updated.

Figure 3:
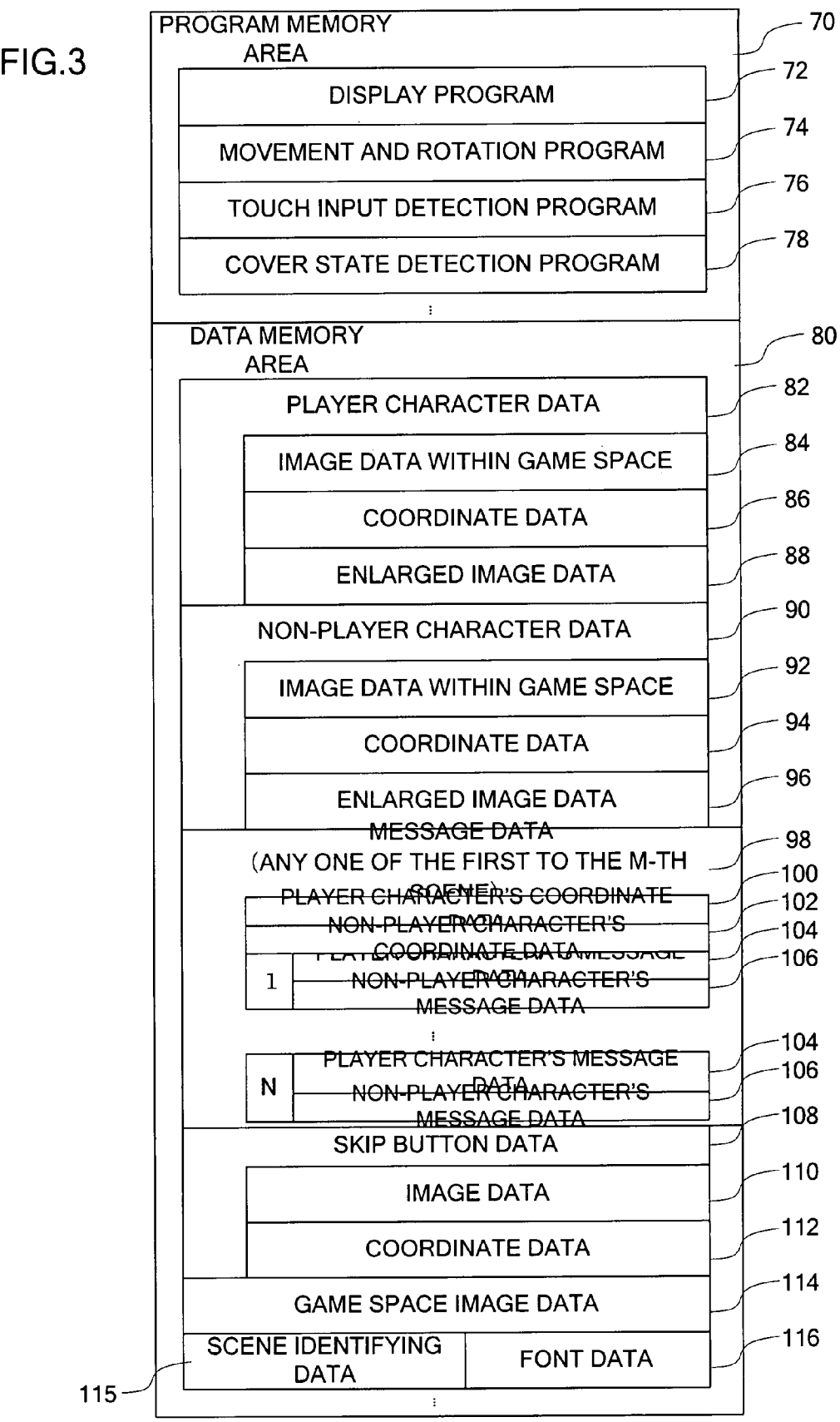
FIG. 3 is an illustrative view showing a memory map applied to FIG. 1 embodiment.

FIG. 3 shows a memory map of the RAM 48 in a case that a conversation game is performed with the game machine 10 constructed as described above. With reference to FIG. 3, a program memory area 70 stores a display program 72, a movement and rotation program 74, a touch input detection program 76, a cover state detection program 78, etc.

The display program 72 displays an image such as a game space, a character, a message, and a skip button, etc. on the LCD 12 and/or the LCD 14 on the basis of the data in the data memory area 80. The movement and rotation program 74 moves a character within the game space, rotates a message image, and so forth. The touch input detection program 76 detects a touch input to the touch panel 22. The cover state detection program 78 detects an opened and closed state, that is, a rotating angle θ of the cover on the basis of a signal from the sensor 64.

Furthermore, the data memory area 80 stores player character data 82, non-player character data 90, message data 98, skip button data 108, game space data 114, scene identifying data 115, font data 116, etc.

The player character data 82 includes player character image data 84 to be displayed within the game space, coordinate data 86 indicative of a display position of a player character and enlarged player character image data 88. The non-player character data 90 includes non-player character image data 92 to be displayed within the game space, coordinate data 94 indicative of a display position of a non-player character, and enlarged non-player character image data 96.

The message data 98 includes coordinate data 100 indicative of a player character's message displaying position, coordinate data 102 indicative of a non-player character's message displaying position, player character's message data 104 and non-player character's message data 106. Each of the player character's message data 104 and the non-player character's message data 106 is divided into N pieces of data block each corresponding to the first message to the N-th message. Each of the 2N pieces of data block corresponds to a remark at a time (unit of speech).

Furthermore, the ROM 28 stores message data of a conversation made in each of M pieces of scenes from the first scene to the M-th scene, and data necessary for each scene is transferred from the ROM 28b to the RAM 48. That is, the message data 98 of the RAM 48 is message data corresponding to a conversation made in any one of M pieces of scenes.

The skip button data 108 includes skip button image data 110 and coordinate data 112 indicative of the display position. The game space image data 114 is data for displaying a game space. The scene identifying data 115 is data for identifying a current scene out of the above-described M pieces of scenes. The font data 116 is data for converting message data to a message image.

Here, each of the above-described image data 84, 88, 92, 96, 110 and 114 has display directivity so as to be rotated to the right 90 degrees with respect to the main axis X. It should be noted that the display direction in this embodiment means a vertical direction of the image (direction of the arrow D: see FIG. 4). However, the game machine is a game machine which is played by operating the switches 20d and 20e with the right hand and the switch 20a with the left hand in a state the game machine is directed vertical to the arrow D, for example, and playing the game machine directed to the arrow D is specific for the present invention. Thus, in the conversation game, images of the game space and the character are positionally correct in a state that the game machine 10 is rotated to the left 90 degrees (see FIG. 4, for example). On the contrary thereto, the font data 116 can be used in another game, etc. and thus, has display directivity along the main axis X. Accordingly, in order to make the message image positionally correct in a state that the game machine 10 is rotated to the left 90 degrees, the font data 116 has to be rotated to the right 90 degrees at a time of drawing. Such a rotation processing is executed by the movement and rotation program 74.

Figure 4:
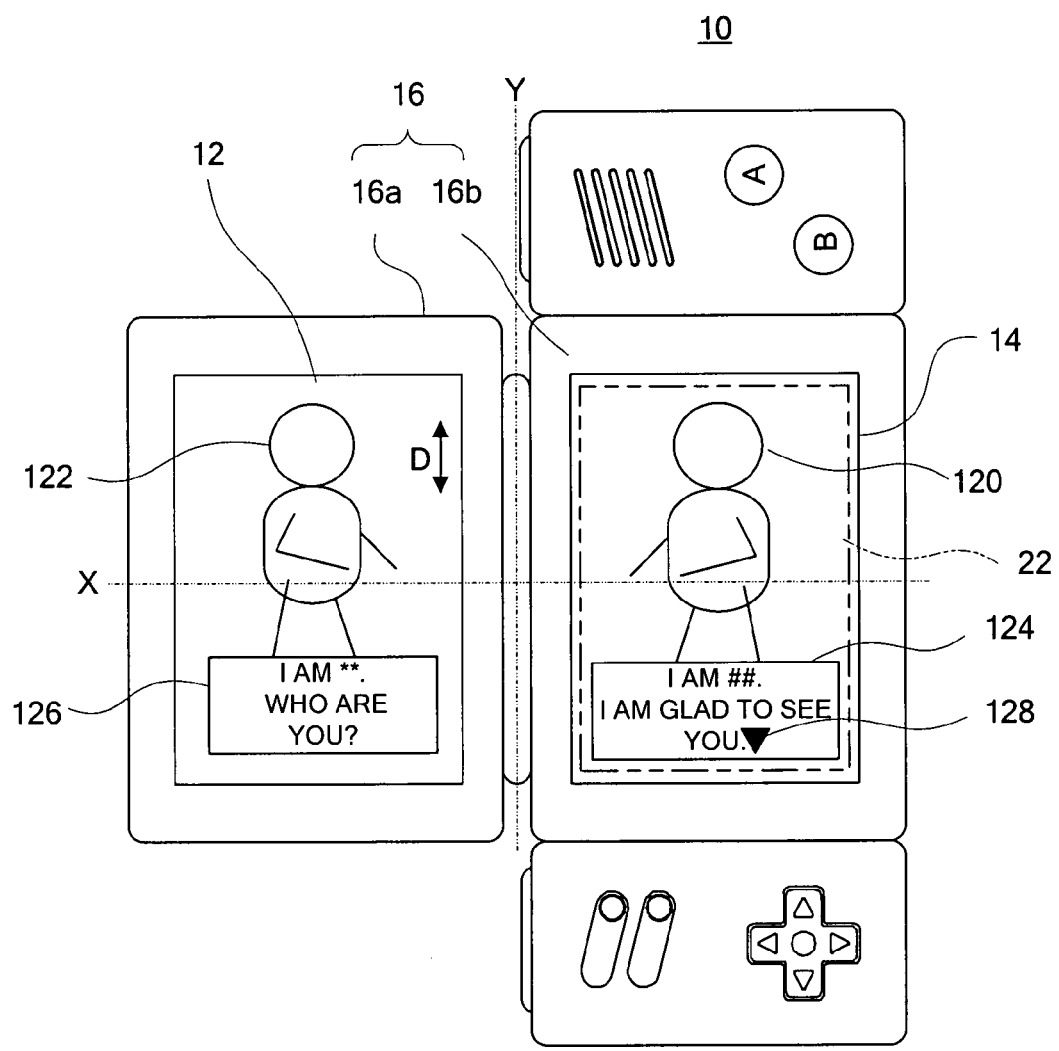
FIG. 4 is an illustrative view showing one example of a game screen applied to FIG. 1 embodiment.
Figure 5:
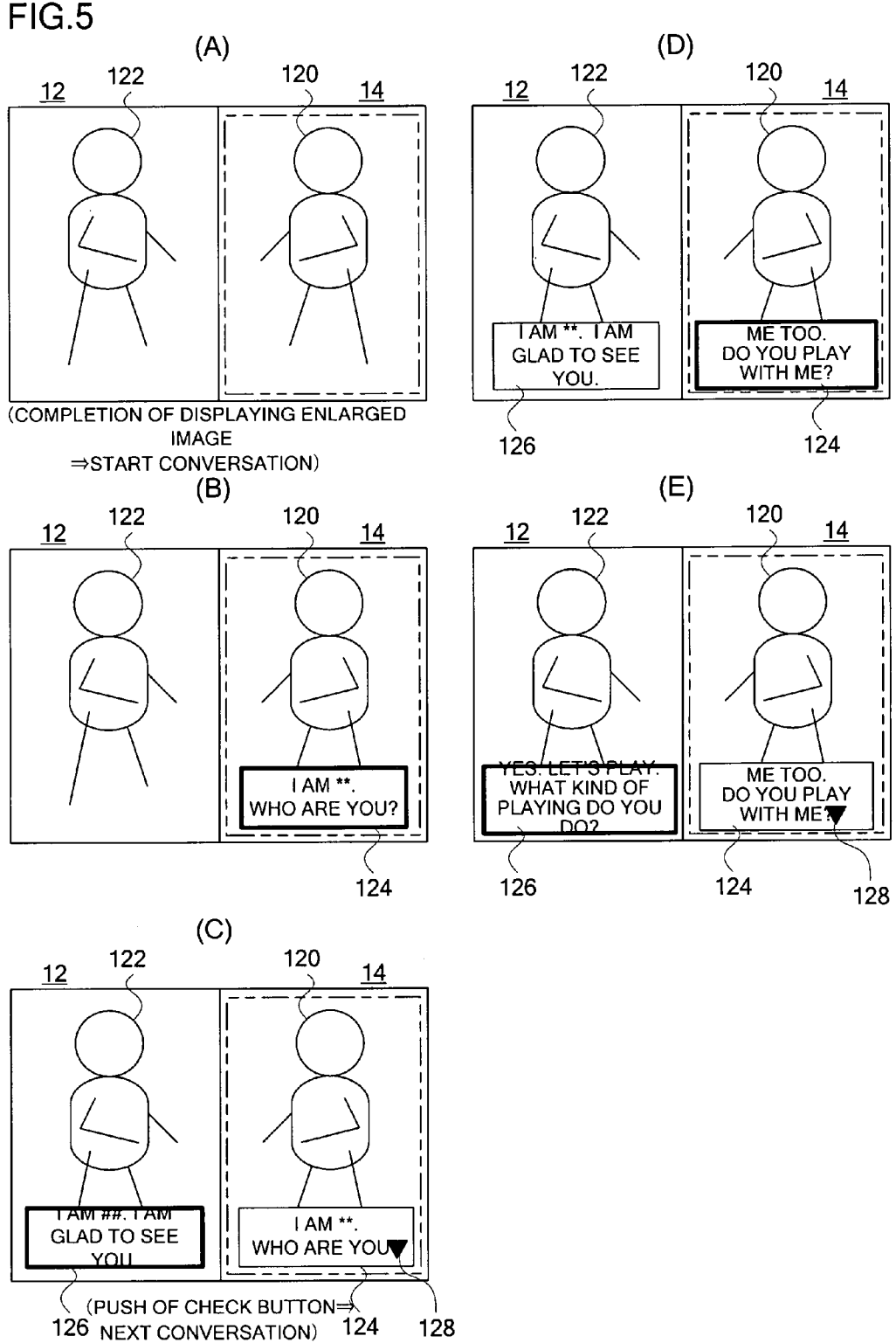
FIG. 5 (A)-FIG. 5 (E) are illustrative views showing changes of the game screen in FIG. 4 in time sequence.
Figure 7:
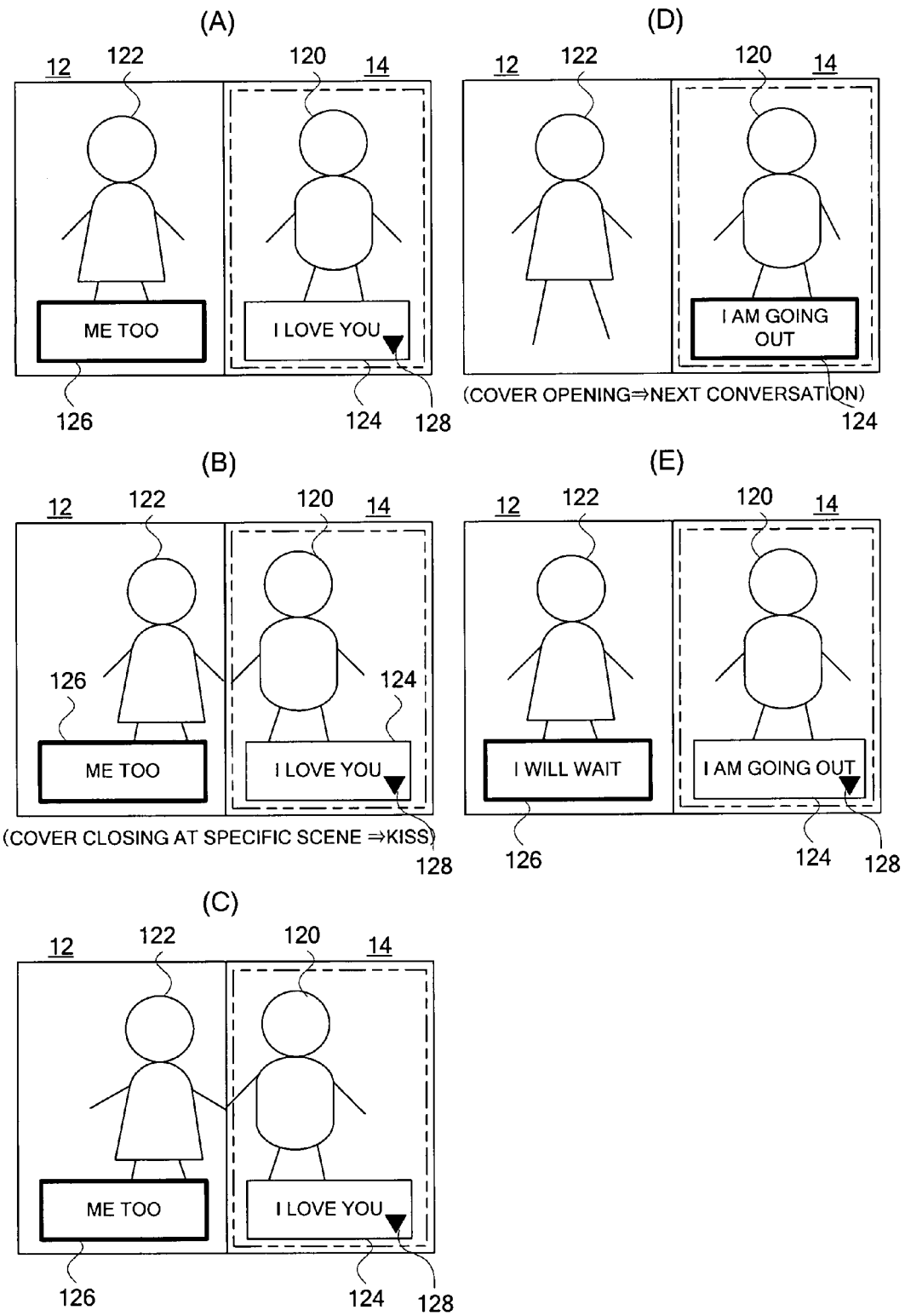
FIG. 7 (A)-FIG. 7 (E) are illustrative views showing changes of the game screen in FIG. 6 in time sequence.

A flow of the conversation game played in the game machine 10 is described by FIG. 4, FIG. 5 (A)-FIG. 5 (E), FIG. 6 and FIG. 7(A)-FIG. 7 (E). The conversation game is played in a state that the game machine 10 is rotated to the left 90 degrees. When the game is started, a game space is displayed on the LCD 14 (right screen), and in the game space, a player character and a non-player character are further displayed (not illustrated). At this time, on the LCD 12 (left screen), a three-dimensional camera image photographed at an arbitrary point (the place where the player character exists) within the game space, for example, is displayed.

Then, when a player touches an arbitrary point within the game space with the stick or the like 24, the player character is moved to the touched position. As a result, when the player character contacts the non-player character, an enlarged player character image 120 is displayed on the LCD 14, and an enlarged non-player character image 122 is displayed on the LCD 12 (see FIG. 4). Succeedingly, a player character's message image 124 is further displayed on the LCD 14, and a non-player character's message image 126 is displayed on the LCD 12. Each of the message image 124 and the message image 126 are displayed at a position symmetrical with respect to the rotation axis Y (that is, the same height). On the bottom-right corner of the LCD 12, a skip button 128 is further displayed.

More specifically, the message images 124 and 126 are displayed and updated as shown in FIG. 5 (A)-FIG. 5 (E). After completion of displaying the enlarged character images 120 and 122 (see FIG. 5 (A)), a conversation is started. The conversation is constituted by N sets of messages by taking the player character's message 124 and the following non-player character's message 126 as one set. That is, "I AM **. WHO ARE YOU?" is first displayed on the LCD 14 as a player character's message 124 (see FIG. 5 (B)). Then, "I AM ##. I AM GLAD TO SEE YOU" is displayed on the LCD 12 as a non-player character's message 126 (see FIG. 5 (C)). When a first set of messages is thus displayed, the skip button 128 is displayed on the bottom-right corner of the LCD 14.

Here, when the check button 128 is pushed (touched) with the stick or the like 24, a second set of messages is displayed. That is, the player character's message 124 is first updated to "ME TOO. DO YOU PLAY WITH ME?" (see FIG. 5 (D)), and the non-player character's message 126 is then updated to "YES. LET'S PLAY. WHAT KIND OF PLAYING DO WE DO?" (see FIG. 5 (E)). Then, on the bottom-right corner of the LCD 14, the skip button 128 is displayed, and the same operation is repeated until the N-th message is displayed. It should be noted that the message updating operation may be executed by regarding a push operation of a specific button of the operating switch 20 as a trigger as well as executed in response to an operation by the check button 128 on the LCD 14.

Thus, the conversation advances in response to a pushing operation of the skip button 128, etc. However, in the specific scene, opening and closing the cover advances a conversation without performing a pushing operation of the skip button 128, etc. One example of such a scene is shown in FIG. 6. In the scene in FIG. 6, the player character 120 on the right screen (LCD 14) is a male, and the non-player character 122 on the left screen (LCD 12) is a female.

Also, in the scene, similar to another scene, the player character's message image 124 is displayed on the LCD 14, and the non-player character's message image 126 is displayed on the LCD 12. Furthermore, on the bottom-right corner of the LCD 14, the skip button 128 is displayed, and in response to a push operation of the skip button 128, the display message is similarly updated.

The message updating processing by the opening and closing operation of the cover is performed in a manner shown in FIG. 7. Now, "I LOVE YOU" is displayed as a player character's message 124 on the LCD 14, and "ME TOO" is displayed on the LCD 12 as a non-player character's message 126 (see FIG. 7 (A)). When a closing operation of the cover is performed here, the player character 120 and the non-player character 122 are close to kiss with each other. Additionally, at a time when the cover is completely closed, a sound effect of a kiss ("smack", for example) may be output. During this, the message on the screen is not updated (see FIG. 7(B) and FIG. 7(C)).

Then, when an opening operation of the cover is performed, a next set of messages is displayed. That is, the player character's message 124 is first updated to "I AM GOING OUT" (see FIG. 7 (D)), and the non-player character's message 126 is updated to "I'LL WAIT" (see FIG. 7 (E)).

Figure 11:
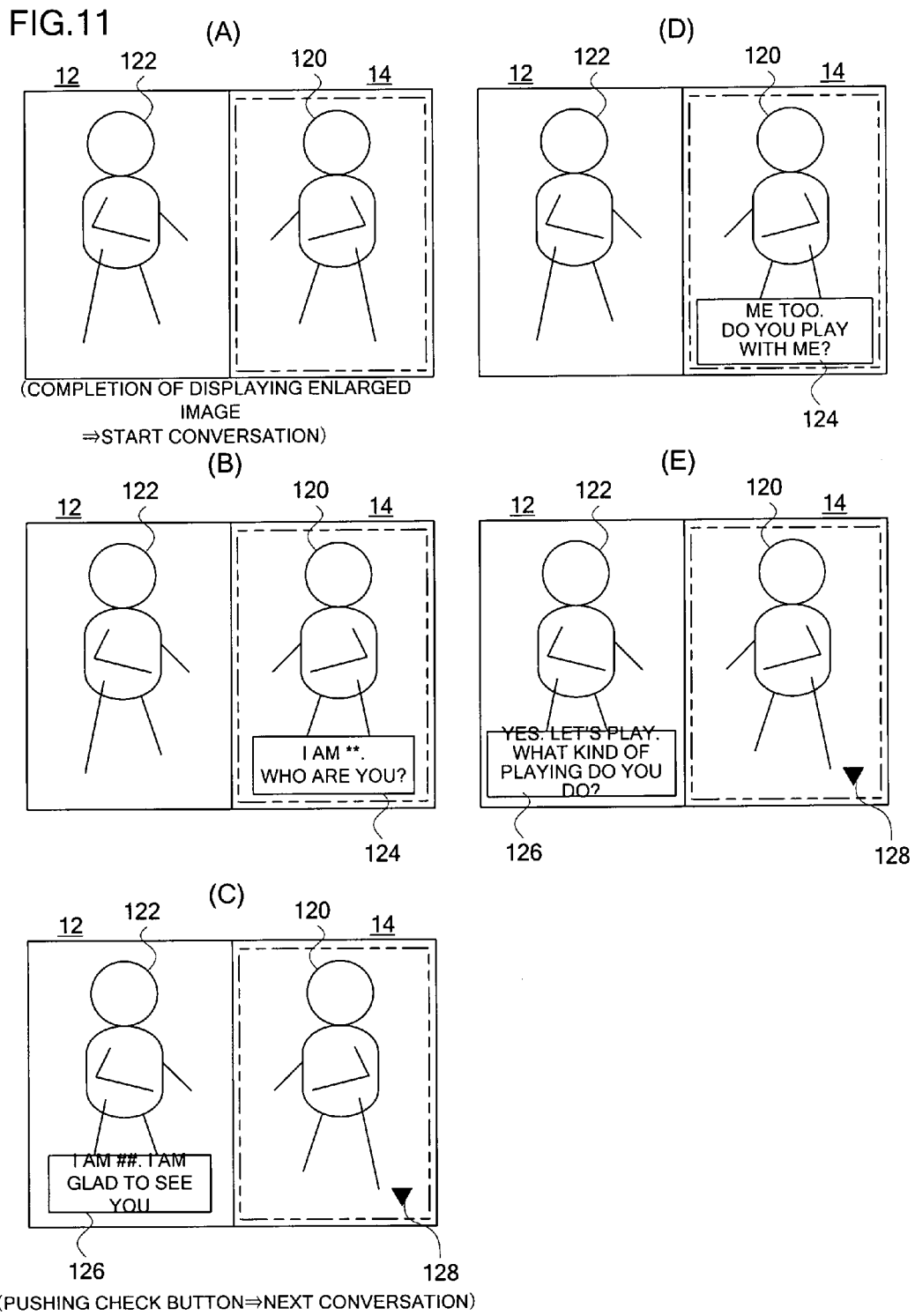
FIG. 11 (A)-FIG. 11 (E) are illustrative views showing changes of the game screen in FIG. 4 in another embodiment in time sequence.

In addition, in each of FIG. 5 (A)-FIG. 5 (E) and FIG. 7(A)-FIG. 7(E), two messages 124 and 126 are alternately updated while being displayed together (that is, when one message is updated, the other message continues to be displayed without being updated), but when one message is updated, the other message may be erased. Such an updating method is shown in FIG. 11 (A)-FIG. 11 (E).

More specifically, after completion of displaying the enlarged character images 120 and 122 (see FIG. 11(A)), a conversation is started. That is, "I AM . WHO ARE YOU?" is first displayed on the LCD 14 as a player character's message 124 (see FIG. 11(B)). Succeedingly, "I am ##. I'm glad to see you . . . " is displayed on the LCD 12 as a non-player character's message 126, and the player character's message 124 is erased at the same time (see FIG. 11(C)). At this time, on the bottom-right corner of the LCD 14, the skip button 128** is displayed.

When the check button 128 is pushed with the stick or the like 24 (the button is touched), a second set of messages is displayed. That is, the player character's message 124, "ME TOO. DO YOU PLAY WITH ME?", is first displayed, and the non-player character's message 126 is erased at the same time (see FIG. 11(D)). Succeedingly, the non-player character's message 126, "YES. LET'S PLAY. WHAT KIND OF PLAYING DO WE DO?", is displayed, and the player character's message 124 is erased at the same time (see FIG. 11(E)). At this time, on the bottom-right corner of the LCD 14, the skip button 128 is displayed, and the same operation is repeated until the N-th message is displayed.

In addition, there also is an updating method as shown in FIG. 12 (A)-FIG. 12 (C). That is, "LET'S PLAY ROCK, PAPER AND SCISSORS" is displayed as a player character's message 124 (see FIG. 12 (A)). Next, "OK. ROCK, PAPER and . . . " is displayed as a non-player character's message 126, and the player character's message 124 is erased at the same time (see FIG. 12 (B)). At this time, on the bottom-right corner of the LCD 14, the skip button 128 is displayed, and in response to pushing of the button 128, "SCISSORS!" is displayed as a player character's message 124, and the non-player character's message 126 is updated to "SCISSORS!" at the same time. (see FIG. 12(C)). That is, messages of both characters are simultaneously displayed (updated).

Figure 8:
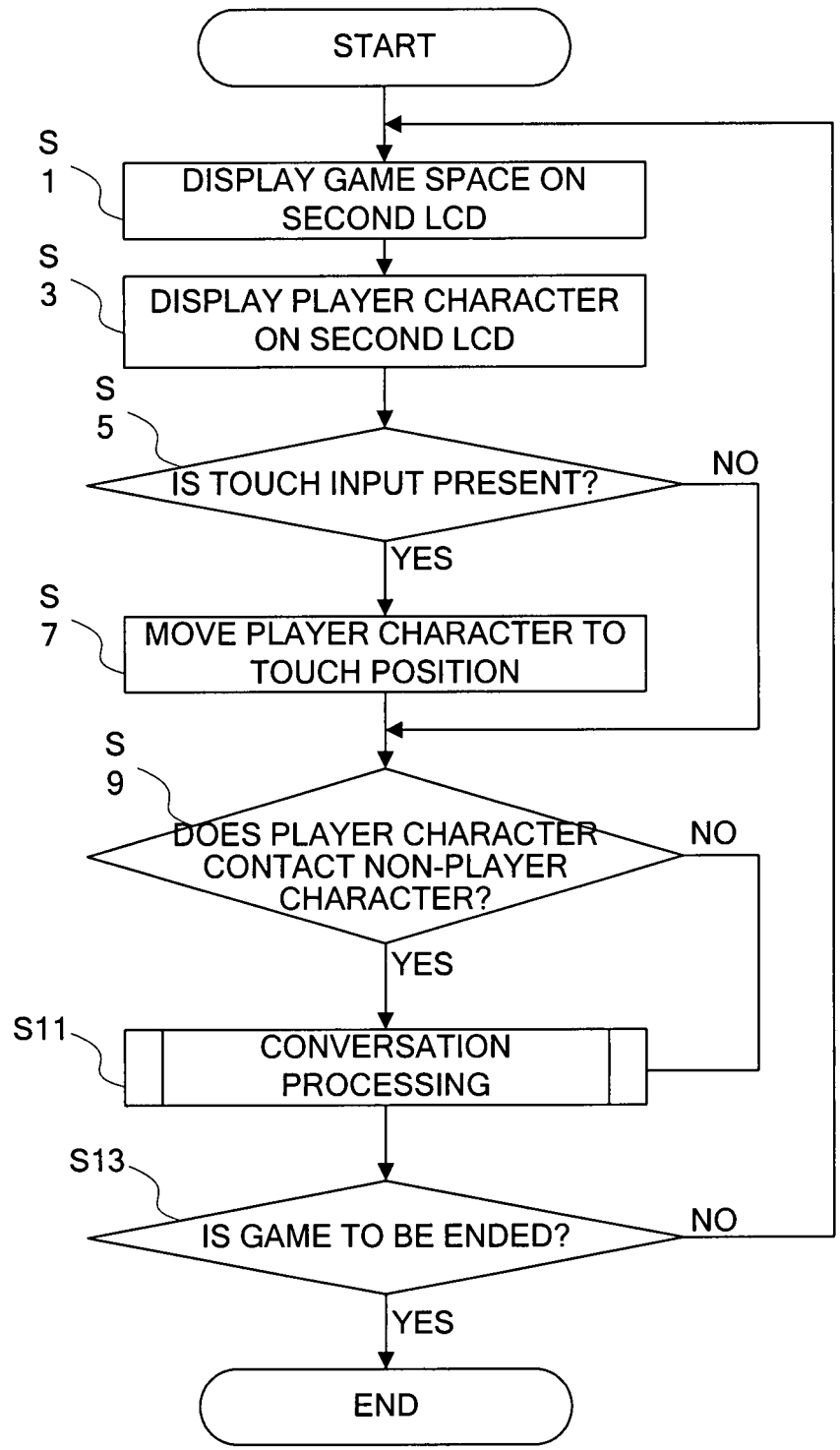
FIG. 8 is a flowchart showing a part of an operation of a CPU applied to FIG. 1 embodiment.
Figure 9:
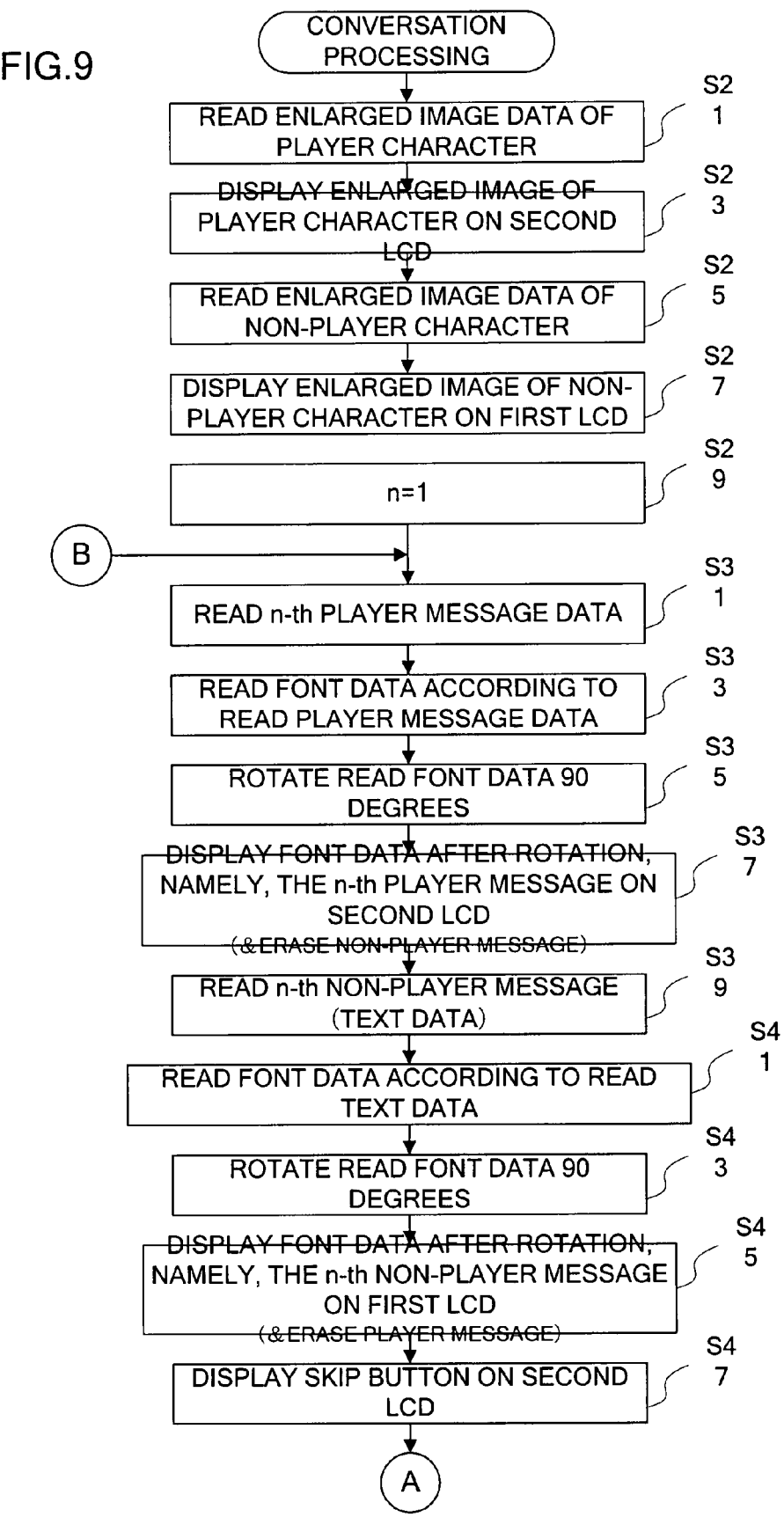
FIG. 9 is a flowchart showing another part of the operation of the CPU applied to FIG. 1 embodiment.
Figure 10:
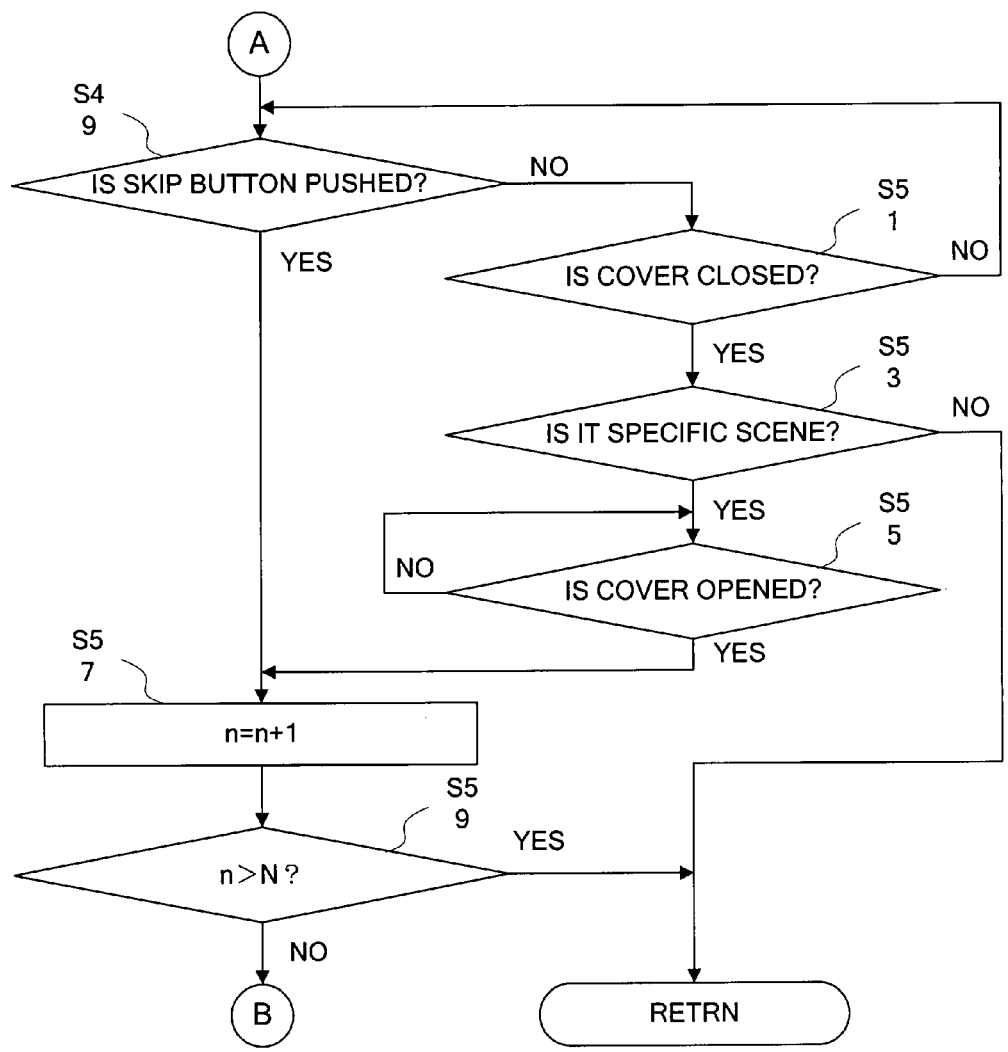
FIG. 10 is a flowchart showing the other part of the operation of the CPU applied to FIG. 1 embodiment.

When the above-described conversation game is played, the CPU core 42 executes a flowchart shown in FIG. 8-FIG. 10. Referring to FIG. 8, in a step S1, a game space (not illustrated) on the basis of game space image data 114 is displayed on the LCD 14. In a step S3, a player character (not illustrated) on the basis of image data 84 within the game space is further displayed on the LCD 14. It should be noted that at this time, a three-dimensional camera image photographed at an arbitrary point within the game space may be displayed on the LCD 12.

In a step S5, the presence or absence of a touch input to the touch panel 22 is determined, and if "NO", the process proceeds to a step S9. When the player touches an arbitrary point within the game space displayed on the LCD 14 with the stick or the like 24, "YES" is determined in the step S5, and the process shifts to a step S7. In the step S7, the player character within the game space is moved to the touch position detected via the touch panel 22. Then, the process shifts to the step S9.

In the step S9, it is determined whether or not the player character contacts with any non-player character. If "NO" here, the process proceeds to a step S13, and if "YES", the process proceeds to the step S13 through conversation processing (described later) in a step S11. In the step S13, it is determined whether or not a game is to be ended, and if "NO", the process returns to the step S1. When a game end operation is performed by the operation key 20, or an operation of closing the cover is performed in the scene except of the specific scene (described later), "YES" is determined in the step S13, and the process is stopped.

Here, the conversation is started when the player character contacts the non-player character, but the trigger of starting the conversation is not limited thereto. For example, when the player character is close to the non-player character, the screen blinks, and when a predetermined button is pushed in this state, a conversation may be started.

The conversation processing in the above-described step S11 is specifically according to a subroutine shown in FIG. 9 and FIG. 10. Referring to FIG. 9, in a step S21, enlarged image data 88 of the player character is read from the RAM 48. In a step S23, a player character 120 on the basis of the read enlarged image data 88 is displayed on the LCD 14. The display position of the player character 120 is on the basis of the coordinate data 86.

In a step S25, enlarged image data 96 of the non-player character is read from the RAM 48. In a S27, a non-player character 122 on the basis of the read enlarged image data 96 is displayed on the LCD 12. The display position of the non-player character 122 is on the basis of the coordinate data 94. At this time, the display screen is as shown in FIG. 5 (A).

When the player character 120 and the non-player character 122 are thus displayed, a conversation is started. The conversation is constituted by N sets of messages. In a step S29, "1" is set to a variable n. In a step S31, n-th player message data, that is, message data corresponding to the n-th message out of the player character's message data 104 is read. In a step S33, font data 116 is read on the basis of the read message data. In a step S35, the read font data 116 is rotated to the right 90 degrees. Then, in a step S37, the rotated font data, that is, the n-th player message 124 is displayed on the LCD 14. The display position of the player message 124 is on the basis of the player character's coordinate data 100. At this time, the display screen is as shown in FIG. 5 (B).

In a step S39, n-th non-player message data, that is, message data corresponding to the n-th message out of the non-player character's message data 106 is read. In a step S41, font data 116 is read on the basis of the read message data. In a step S43, the read font data 116 is rotated to the right 90 degrees. Then, in a step S45, the rotated font data, that is, the n-th non-player message 126 is displayed on the LCD 12. The display position of the non-player message 126 is on the basis of the non-player character's coordinate data 102. In addition, in a step S47, a skip button 128 is displayed on the LCD 14 on the basis of the skip button data 108. At this time, the display screen is as shown in FIG. 5 (C).

In addition, in a case that two messages 124 and 126 are alternately displayed, the player message 124 is erased in the step S45 (the display screen in this case is as shown in FIG. 11 (C)). After n=2, the non-player message 126 is erased in the step S37.

When the n-th message is thus displayed, the process enters a loop of steps S49 and S51. Referring to FIG. 10, in the step S49, it is determined whether or not the skip button 128 is pushed on the basis of a signal via the touch panel 22, and in the step S51, it is determined whether or not the cover is closed on the basis of a signal from the sensor 64. When the skip button 128 on the LCD 14 is touched with the stick or the like 24, "YES" is determined in the step S49. When the upper housing 16a is rotated in a closing direction, and the rotating angle θ is below a threshold value θ1 (150 degrees, for example), "YES" is determined in the step S51. If "YES" in the step S49, the process proceeds to a step S57, and if "YES" in the step S51, the process proceeds to a step S53.

In the step S53, it is determined whether or not the current scene is the specific scene on the basis of the scene identifying data 115. If "NO" here, the process is restored to the hierarchical upper level of the routine, and if "YES", it is determined whether or not the cover is opened on the basis of a signal from the sensor 64 in a step S55. When the upper housing 16a is rotated in an opening direction, and the rotating angle θ is thus above a threshold value θ2 (160 degrees, for example), "YES" is determined in the step S55, and the process shifts to the step S57. It should be noted that the threshold values θ1 and θ2 relating to the rotating angle θ may be different from or the same as each other (θ1=θ2=160 degrees, for example).

In the step S57, the variable n is incremented. In a succeeding step S59, it is determined whether or not the variable n is larger than a constant N, and if "YES" here, the process is restored to the hierarchical upper level of the routine. If "NO" in the step S59, the process returns to the step S31.

Accordingly, when the skip button 128 is pushed in a FIG. 5 (C) state, the display message is updated as shown in FIG. 5 (D) and FIG. 5 (E). On the other hand, when the cover is closed in the specific scene like the scene shown in FIG. 7 (A), for example and the closed cover is opened, the display message is updated as shown in FIG. 7 (D) and FIG. 7 (E).

Even if the skip button 128 is pushed in place of the cover being closed in the scene shown in FIG. 7 (A), the displayed message is updated as shown in FIG. 7 (D) and FIG. 7 (E). However, in this case, the updating process of the character image shown in FIG. 7 (B) and FIG. 7 (C) is omitted (that is, the characters do not kiss with each other).

As understood from the above description, in this embodiment, the first character image data (player character's enlarged image data 88) and the second character image data (non-player character's enlarged image data 96), and the first message data (player character's message data 104) and the second message data (non-player character's message data 106) respectively associated with the first character image data and the second character image data are stored in the RAM 48. The CPU core 42 displays the first character image (player character 120) based on the first character image data on the LCD 14 (S23), and displays the second character image (non-player character image 122) based on the second character image data on the LCD 12 (S27). Furthermore, in association with such a character display processing, the first message image (player message 124) based on the first message data is further displayed on the LCD 14 (S37), and the second message image (non-player message 126) based on the second message data is further displayed on the LCD 12 (S45). Then, when a predetermined operation is detected through a touch panel 22, etc., at least one of the first message image which is being displayed on the LCD 14 and the second message image which is being displayed on the LCD 12 is updated (S57). Thus, it is possible to display the conversation between the characters clearly and emotionally.

In the above, the invention is described by means of the game machine 10, but the invention can be applied to a game apparatus having a first display and a second display which are adjacent with each other, a memory storing first character image data and second character image data, and first message data and second message data respectively associated with the first character image data and the second character image data, and an operating means.

Although the embodiments described herein have been described and illustrated in detail, it is clearly understood that the same is by way of illustration and example only and is not to be taken by way of limitation, the spirit and scope of these embodiments being limited only by the terms of the appended claims.

What is claimed is:

1. A non-transitory recording medium recording a game program, wherein said game program causes a computer of a game apparatus having a first display and a second display which are adjacent with each other, a memory storing player character image data and non-player character image data, and first message data and second message data respectively associated with the player character image data and the non-player character image data, and an operating device to execute displaying a player character image based on said player character image data on said first display, displaying a non-player character image based on said non-player character image data on said second display, displaying a first message image based on said first message data on said first display while said player character image is displayed, displaying a second message image based on said second message data on said second display while said non-player character image is displayed, and updating at least any one of the first message image which is being displayed on said first display and the second message image which is being displayed on said second display when a predetermined operation is performed by said operating device.

2. A non-transitory recording medium recording a game program according to claim 1, wherein said first display and said second display are arranged in either side of a predetermined axis, each of said player character image data and said non-player character image data has display directivity of a first direction along said axis, said memory further stores font image data having display directivity of a second direction different from said first direction by a predetermined angle, said game program causes said computer to further execute reading said font image data from said memory in accordance with said first message data, performing rotation processing by said predetermined angle on the read font image data, reading said font image data from said memory in accordance with said second message data, and performing rotation processing by said predetermined angle on the font image data read when reading said font image data from said memory in accordance with said second message data, and the display processing of displaying the first message image based on said first message data on said first display is executed on the basis of the font image data on which said rotating processing has been performed, and the display processing of displaying the second message image based on said second message data on said second display while said non-player character image is displayed is executed on the basis of the font image data on which said rotating processing has been performed.

3. A non-transitory recording medium recording a game program according to claim 2, wherein a display surface of each of said first display and said second display has a rectangular shape, said predetermined angle is 90 degrees, and said first display and said second display are arranged in such a position that a longitudinal direction of each of the display surfaces is coincident with said first direction, and a straight line passing through a central point of each of the display surfaces is vertical to said axis.

4. A non-transitory recording medium recording a game program according to claim 1, wherein displaying the first message image based on said first message data on said first display and displaying the second message image based on said second message data on said second display respectively displays said first message image and said second message image at the same height.

5. A non-transitory recording medium recording a game program according to claim 1, wherein said game apparatus further has a first housing and a second housing connected to be rotated about said axis, and said first display and said second display are respectively provided to said first housing and said second housing.

6. A non-transitory recording medium recording a game program according to claim 1, wherein said operating device includes a touch panel to be set on the display surface of said first display, said game program causes said computer to further execute displaying an icon image on said first display in association with the display processing of displaying the first message image based on said first message data on said first display and displaying the second message image based on said second message data on said second display, and updating at least any one of the first message image which is being displayed on said first display and the second message image which is being displayed on said second display when a predetermined operation is performed by said operating device executes updating processing when a touch operation to said icon image is detected by said touch panel.

7. A non-transitory recording medium recording a game program according to claim 5, wherein said game apparatus further has a detector for detecting an opened and closed state of said first housing and said second housing, and updating at least any one of the first message image which is being displayed on said first display and the second message image which is being displayed on said second display when a predetermined operation is performed by said operating device executes updating processing in association with a detection result by said detector.

8. A non-transitory recording medium recording a game program according to claim 7, wherein first message data and second message data stored in said memory are associated with any of a plurality of game scenes, said memory further stores scene identifying data for identifying with which of said plurality of game scenes the first message data and the second message data stored in said memory is associated, said positional relationship is an angle formed by said first housing and said second housing, said game program causes said computer to further execute determining whether or not a detection result by said detector is below a first threshold value, determining whether or not said scene identifying data indicates a specific game scene when a determination result of whether or not the detection result is below the first threshold value is affirmative, and determining whether or not a detection result by said detector is above a second threshold value when a determination result of determining whether or not said scene identifying data indicates a specific game scene is affirmative, and updating at least any one of the first message image which is being displayed on said first display and the second message image which is being displayed on said second display when a predetermined operation is performed by said operating device executes updating process when a determination result of determining whether or not the detection result by said detector is above a second threshold value is affirmative.

9. A game apparatus, comprising:

a first display and a second display which are adjacent with each other;

a memory storing player character image data and non-player character image data, and first message data and second message data respectively associated with the player character image data and the non-player character image data;

an operating device;

a processor controlled to:

display a player character image based on said player character image data on said first display;

display a non-player character image based on said non-player character image data on said second display;

display a first message image based on said first message data on said first display while said player character image is displayed;

display a second message image based on said second message data on said second display while said non-player character image is displayed; and update at least any one of the first message image which is being displayed on said first display and the second message image which is being displayed on said second display when a predetermined operation is performed by said operating device.

10. A controlling method of a game apparatus having a first display and a second display which are adjacent with each other, a memory storing player character image data and non-player character image data, and first message data and second message data respectively associated with the player character image data and the non-player character image data, and an operating device, comprising:

displaying a player character image based on said player character image data on said first display;

displaying a non-player character image based on said non-player character image data on said second display;

displaying a first message image based on said first message data on said first display while said player character image is displayed;

displaying a second message image based on said second message data on said second display while said non-player character image is displayed; and updating at least any one of the first message image which is being displayed on said first display and the second message image which is being displayed on said second display when a predetermined operation is performed by said operating device.

11. A system, comprising:

at least one game apparatus including
- a first display and a second display which are adjacent with each other;
- a memory storing player character image data and non-player character image data, and first message data and second message data respectively associated with the player character image data and the non-player character image data;
- an operating device;
- a processor controlled to:
- display a player character image based on said player character image data on said first display;
- display a non-player character image based on said non-player character image data on said second display;
- display a first message image based on said first message data on said first display while said player character image is displayed;
- display a second message image based on said second message data on said second display while said non-player character image is displayed; and
- update at least any one of the first message image which is being displayed on said first display and the second message image which is being displayed on said second display when a predetermined operation is performed by said operating device.

* * * * *